United States Patent
Archibald et al.

(10) Patent No.: US 6,622,500 B1
(45) Date of Patent: Sep. 23, 2003

(54) ENERGY-EFFICIENT CAPACITY CONTROL METHOD FOR AN AIR CONDITIONING COMPRESSOR

(75) Inventors: Charles Andrew Archibald, Lockport, NY (US); Karma Vir Sangwan, East Amherst, NY (US); Thomas Martin Urbank, Lockport, NY (US); James Joseph Christen, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/267,709

(22) Filed: Oct. 9, 2002

Related U.S. Application Data

(60) Provisional application No. 60/378,849, filed on May 8, 2002.

(51) Int. Cl.$^7$ .............................. F25B 1/00; F25B 29/00
(52) U.S. Cl. ....................................... 62/173; 62/228.3
(58) Field of Search ................................ 62/228.3, 229, 62/228.4, 173, 90

(56) References Cited

U.S. PATENT DOCUMENTS

| | | | | |
|---|---|---|---|---|
| 5,689,960 A | * | 11/1997 | Bearint | 62/77 |
| 5,829,264 A | * | 11/1998 | Ishigaki et al. | 62/228.3 |
| 6,138,468 A | * | 10/2000 | Yokomachi et al. | 62/228.5 |
| 6,170,277 B1 | * | 1/2001 | Porter et al. | 62/228.3 |
| 6,321,545 B1 | * | 11/2001 | Ota et al. | 62/133 |
| 6,385,982 B1 | * | 5/2002 | Ota et al. | 62/209 |

* cited by examiner

Primary Examiner—Marc Norman
(74) Attorney, Agent, or Firm—Patrick M. Griffin

(57) ABSTRACT

An energy-efficient air conditioning control method regulates the capacity of a variable capacity refrigerant compressor based on the compressor suction and discharge pressures and a measure of the ambient temperature. A target suction pressure is selected based on the ambient temperature and the sensed discharge pressure, and the capacity of the compressor is adjusted as required to attain the target suction pressure. In a first embodiment of the control method, the ambient temperature is used to select a target evaporator outlet air temperature, which is used along with the sensed discharge pressure to select the target suction pressure, while in a second embodiment of the control method, the target suction pressure is selected directly on the basis of the ambient temperature and the sensed discharge pressure.

12 Claims, 4 Drawing Sheets

ENERGY-EFFICIENT CAPACITY CONTROL METHOD FOR AN AIR CONDITIONING COMPRESSOR

PRIOR APPLICATION

This application claims the benefit of prior Provisional Patent Application Serial No. 60/378,849 filed May 8, 2002.

FIELD OF THE INVENTION

This invention relates to an energy-efficient control method for a variable capacity refrigerant compressor of an air conditioning system.

BACKGROUND OF THE INVENTION

Variable capacity refrigerant compressors have been utilized in both manual and automatic vehicle air conditioning systems, primarily to reduce engine load disturbances associated with compressor clutch cycling. In a typical implementation, the compressor includes one or more pistons coupled to a tiltable wobble plate or swash plate, and a pneumatic or electromagnetic control valve for adjusting the pressure in a crankcase of the compressor to control the compressor capacity. The system control strategy usually involves adjusting the compressor capacity to maintain a predetermined low-side refrigerant condition (refrigerant suction pressure or evaporator outlet air temperature, for example) that provides maximum cooling without evaporator icing, and using a high-side pressure switch to disengage the compressor clutch if the refrigerant discharge pressure becomes too high. The inlet air may consist of outside air or recirculated cabin air, and the temperature of the discharge air is typically controlled by adjusting a mechanism (such as an air mix door) that reheats a portion of the conditioned air.

While the above-described control strategy is simple and reasonably effective, it has been recognized that the energy efficiency of the system could be significantly improved by increasing the usage of recirculated cabin air and reducing the compressor capacity in a way that provides adequate dehumidification while minimizing reheating of the conditioned air. However, since energy-efficient controls typically require a number of external sensors for measuring system and ambient parameters, development efforts have primarily been focused on high-end automatic climate control systems that usually include such sensors anyway. Accordingly, what is needed is a compressor capacity control method that provides energy-efficient operation at a low cost.

SUMMARY OF THE PRESENT INVENTION

The present invention is directed to an improved and energy-efficient control method for a variable capacity refrigerant compressor of an air conditioning system, where the control is based on the compressor suction and discharge pressures and a measure of the ambient temperature. According to the invention, a target suction pressure is selected based on the ambient temperature and the sensed discharge pressure, and the capacity of the compressor is adjusted as required to attain the target suction pressure. In a first embodiment, the ambient temperature is used to select a target evaporator outlet air temperature, which is used along with the sensed discharge pressure to select the target suction pressure, while in a second embodiment the target suction pressure is selected directly on the basis of the ambient temperature and the sensed discharge pressure. The control method is conveniently and cost-effectively carried out in an implementation where the compressor includes a capacity control valve with integral suction and discharge pressure sensors, and integral signal conditioning circuitry.

BRIEF DESCRIPTION OF THE DRAWING

The present invention will now be described, by way of example, with reference to the accompanying drawings in which.

DESCRIPTION OF THE PREFERRED EMBODIMENT

Figure 1:
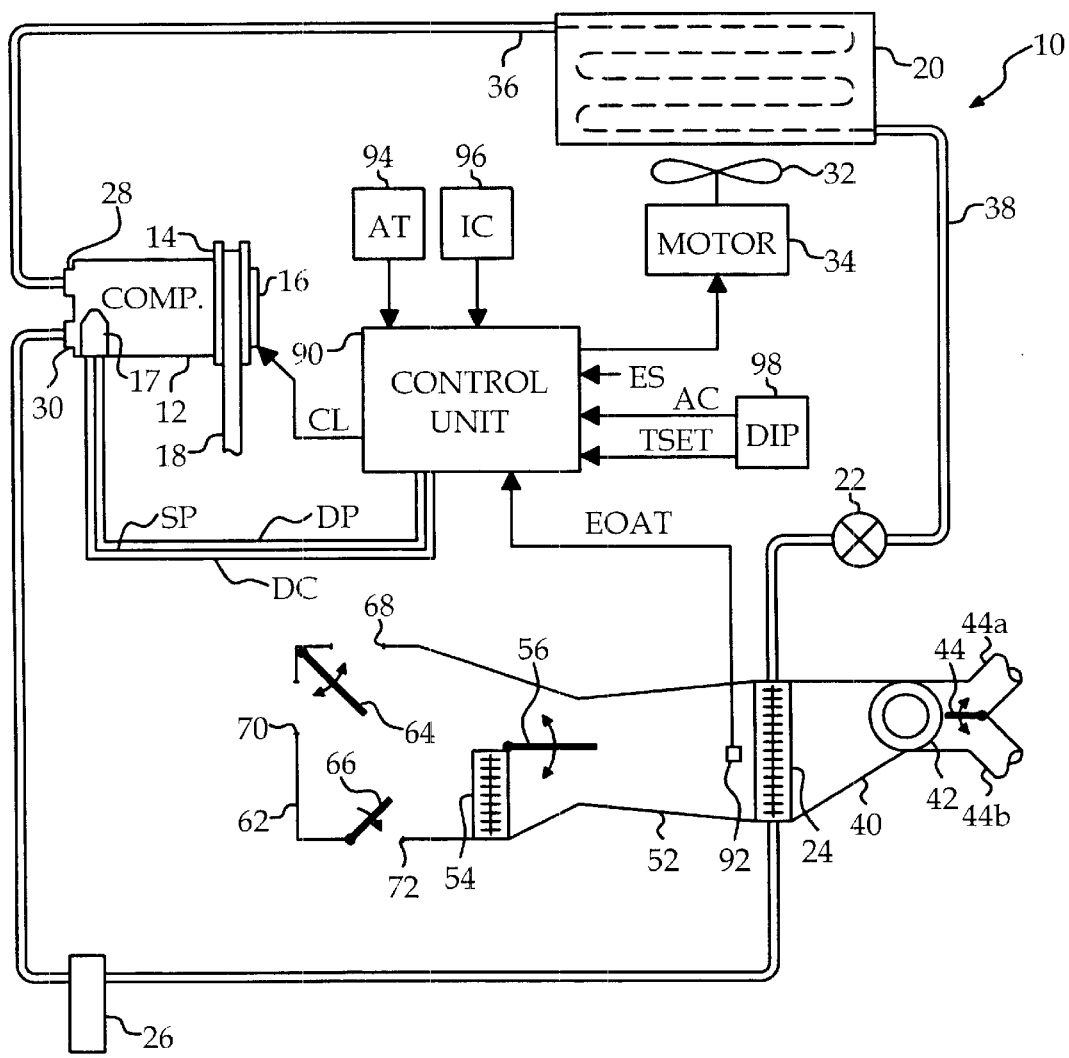
FIG. 1 is a diagram of a vehicle air conditioning system according to this invention, including a variable capacity refrigerant compressor, an electrically activated capacity control valve, and a microprocessor-based control unit.

Referring to FIG. 1, the reference numeral 10 generally designates a vehicle air conditioning system, including a variable capacity refrigerant compressor 12 coupled to a drive pulley 14 via an electrically activated clutch 16. The pulley 14 is coupled to a rotary shaft of the vehicle engine (not shown) via drive belt 18, and the clutch 16 is selectively engaged or disengaged to turn the compressor 12 on or off, respectively. The compressor capacity control is effectuated by an electrically activated capacity control valve 17 mounted in the rear head of compressor 12. In the illustrated embodiment, the compressor 12 has an internal bleed passage coupling its crankcase to the suction port 30, and the capacity control valve 17 selectively opens and closes a passage between the crankcase and the discharge port 28 to control the crankcase pressure, and therefore, the compressor pumping capacity. As described below in reference to FIG. 2, the capacity control valve 17 additionally includes integral suction and discharge pressure sensors and signal conditioning circuitry coupled to the pressure sensors.

In addition to the compressor 12, the system 10 includes a condenser 20, an orifice tube 22, an evaporator 24, and an accumulator/dehydrator 26 arranged in order between the compressor discharge port 28 and suction port 30. A cooling fan 32, operated by an electric drive motor 34, is controlled to provide supplemental air flow through the condenser 20 for removing heat from condenser 20. The orifice tube 22 allows the cooled high pressure refrigerant in line 38 to expand in an isenthalpic process before passing through the evaporator 24. The accumulator/dehydrator 26 separates low pressure gaseous and liquid refrigerant, directs a gaseous portion to the compressor suction port 30, and acts as a reservoir for the reserve refrigerant charge. In an alternative system configuration, the orifice tube 22 is replaced with a thermostatic expansion valve (TXV); in this case, the accumulator/dehydrator 26 is omitted, and a receiver/drier (R/D) is inserted in line 38 upstream of the TXV to ensure that sub-cooled liquid refrigerant is supplied to the inlet of the TXV.

The evaporator 24 is formed as an array of finned refrigerant conducting tubes, and an air intake duct 40 disposed on one side of evaporator 24 houses an inlet air blower 42 driven by an electric blower motor 43 to force air past the evaporator tubes. The duct 40 is bifurcated upstream of the blower 42, and an inlet air control door 44 is adjustable as shown to control inlet air mixing; depending on the door position, outside air may enter blower 42 through duct leg 44a, and passenger compartment air may enter blower 42 through duct leg 44b.

An air outlet duct 52 disposed on the downstream side of blower 42 and evaporator 24 houses a heater core 54 formed as an array of finned tubes that conduct engine coolant. A temperature control door 56 pivoted at a point near the heater core 54 is adjustable as shown to control what proportion of air exiting evaporator 24 must pass through the heater core 54. The heated and un-heated air portions are mixed in a plenum portion 62 of outlet duct 52 downstream of heater core 54 and temperature control door 56, and a pair of mode control doors 64, 66 are adjustable as shown to direct the mixed air through one or more outlets, including a defrost outlet 68, a panel outlet 70, and a heater outlet 72.

In the illustrated embodiment, the compressor clutch 16, the capacity control valve 17, the condenser motor 34, the blower motor 43, the air inlet door 44, the temperature control door 56, and the mode control doors 64 and 66 are controlled by a microprocessor-based control unit 90. For convenience, actuators for positioning the doors 44, 56, 64 and 66 have been omitted in FIG. 1. As indicated in FIG. 1, the control is carried out in response to a number of input signals including the refrigerant suction and discharge pressure signals SP, DP developed by the sensors within capacity control valve 17, the ambient air temperature AT, the in-car air temperature IC, the evaporator outlet air temperature EOAT, a set temperature TSET, and the air conditioning request status AC. The EOAT signal is developed by a temperature sensor 92 positioned on the evaporator 24 or in its outlet air stream, and the temperatures AT and IC are developed by suitably positioned temperature sensors 94 and 96. The TSET and AC signals are provided by a driver interface panel (DIP) 98, including a mechanism such as a knob for selecting a desired cabin temperature and a pair of switch inputs for activating normal or energy-efficient air conditioning. The desired cabin temperature is indicated by the TSET signal, and the air conditioning request (i.e., AC off, normal AC, or energy-efficient AC) is indicated by the AC signal.

The present invention is specifically directed to a control of the compressor capacity by suitable modulation of the capacity control valve 17, and such control is described in detail below in reference to FIGS. 3 and 4. In other respects, the functionality of control unit 90 may be substantially conventional in nature. For example, the condenser motor 34 may be activated in response to the discharge pressure DP, the compressor clutch 16 is normally activated whenever air conditioning operation is requested, and the blower motor 43 and the doors 44, 56, 64 and 66 are controlled by an automatic climate control algorithm based on TSET, AT, IC and various measured and/or estimated parameters. The automatic climate control algorithm essentially computes the cooling requirement of the vehicle, and retrieves pre-programmed command settings for the blower speed, the air discharge mode, the cabin air recirculation level, and the air discharge temperature. The commanded air discharge mode is used to position the mode control doors 64 and 66, the commanded blower speed is used to activate blower motor 43, and the commanded cabin air recirculation level is used to position the air inlet control door 44. The commanded air discharge temperature is compared with a measured discharge temperature (such as an air duct temperature) to produce an error signal that is used to control the temperature control door 56.

Since the present invention is directed to an energy efficient control of the compressor capacity based on ambient temperature AT, there will typically be more reserve capacity than occurs in a conventional control where the capacity is regulated to maintain maximum cooling capability without evaporator icing. Consequently, the automatic climate control will automatically respond by commanding less re-heating by heater core 54 and a higher level of cabin air recirculation. However, if the driver requests normal air conditioning, or if the commanded air discharge temperature cannot be achieved during energy-efficient air conditioning (as may occur under conditions of high humidity), the control unit 90 regulates the compressor capacity to provide maximum cooling. Thus, the compressor 12 is operated in an energy-efficient mode if enabled by the driver, so long as it is possible to satisfy the driver set temperature TSET.

Figure 2:
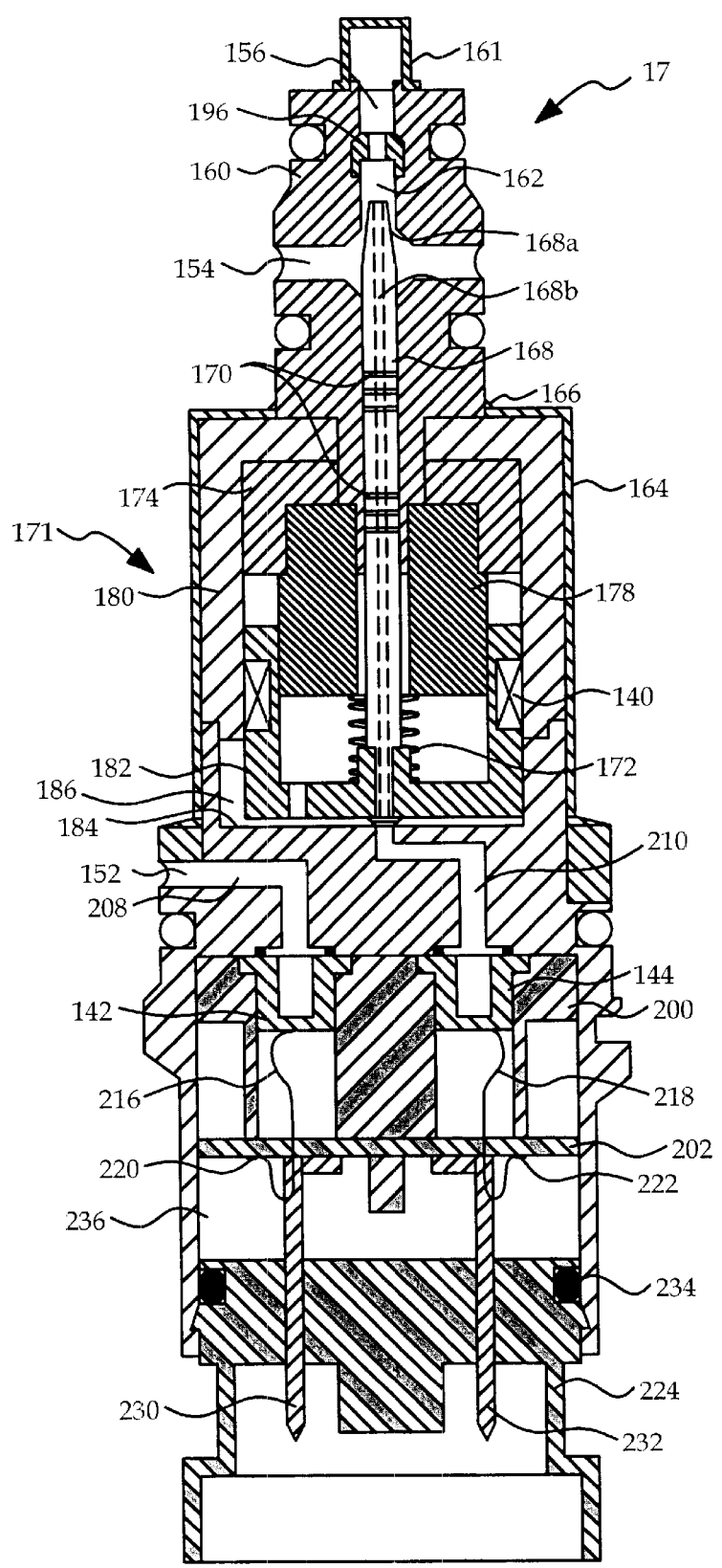
FIG. 2 is a cross-sectional view of the capacity control valve of FIG. 1.

As mentioned above, the capacity control valve 17 is electrically controlled to selectively open and close a passage between the compressor crankcase and the discharge port 28 to control the compressor pumping capacity, and includes integral suction and discharge pressure sensors 142, 144 and signal conditioning circuitry coupled to the pressure sensors 142, 144. Referring to FIG. 2, the capacity control valve 17 includes three ports 152, 154 and 156 that are respectively placed in communication with chambers containing the compressor suction, crankcase and discharge pressures. The crankcase and discharge ports 154 and 156 are formed in a pressure port 160, with the discharge port 156 being defined by the inboard end of a central axial bore 162 passing through pressure port 160. A screen 161 prevents any foreign matter from entering the discharge port 156. The pressure port 160 is secured to a housing shell 164 by a weld 166, and a plunger 168 partially disposed within the bore 162 is axially positioned such that its inboard end either opens or closes a portion of bore 162 that couples the crankcase and discharge ports 154 and 156. The housing shell 164 encloses an electrically activated solenoid assembly 171 for positioning the plunger 168 within the bore 162, including a spring 172 for biasing the plunger 168 to a retracted position as shown in which the plunger 168 engages the housing piece 184 and refrigerant is permitted to flow from the discharge port 156 to the crankcase port 154. The solenoid assembly 171 includes a set of permanent magnets 174, 176 disposed between inner and outer pole pieces 178 and 180, and a cup-shaped spool 182 carrying a movable coil 140. The spool 182 is secured to an outboard portion of plunger 168, and the housing piece 184 defines a cavity 186 outboard of the spool 182. Activating the coil 140 produces a force that opposes the bias of spring 172 and moves the plunger 168 to an extended position (limited by the stop 196) in which its outboard end blocks the portion of bore 162 between discharge port 156 and crankcase port 154. A central axial bore 168b through plunger 168 couples the discharge port 156 to the cavity 186, and a passage 210 in housing piece 184 couples the cavity 186 to the interior of discharge pressure sensor 144 so that the pressure sensor 144 measures the compressor discharge pressure. The passage 208 couples the suction port 152 to the interior of pressure sensor 142 so that the pressure sensor 142 measures the compressor suction pressure. Significantly, the opening of passage 210 is directly aligned with the plunger bore 168b so that the discharge pressure sensor 144 is in direct communication with discharge port 156 regardless of the position of plunger 168.

The pressure sensors 142, 144 are retained with respect to the housing piece 184 by a spacer element 200. The sensors 142, 144 are preferably conventional stainless steel pressure sensors, each having a diaphragm that is subject to flexure due to the pressure differential across it, although other types of pressure sensors could alternatively be used. The mechanical strain associated with the flexure is detected by a piezo-resistor circuit (not depicted) formed on the outboard surface of respective sensor diaphragm, and flexible conductors 216, 218 couple the respective piezo-resistor circuits to bond pads 220, 222 formed on a circuit board 202. A connector 224 is secured to the outboard end of housing piece 184 by swaging for example, and a set of terminals 230, 232 passing through the connector 224 are soldered to the bond pads 220, 222. An O-ring 234 compressed between the connector 224 and the housing piece 184 seals the enclosed area 236 from environmental contaminants, and also isolates the area 236 from barometric pressure. Accordingly, the pressures measured by the sensors 142 and 144 can be calibrated to indicate the absolute pressure of the refrigerant in the respective suction and discharge passages 208 and 210, as opposed to a gauge pressure that varies with ambient or barometric pressure.

Figure 3:
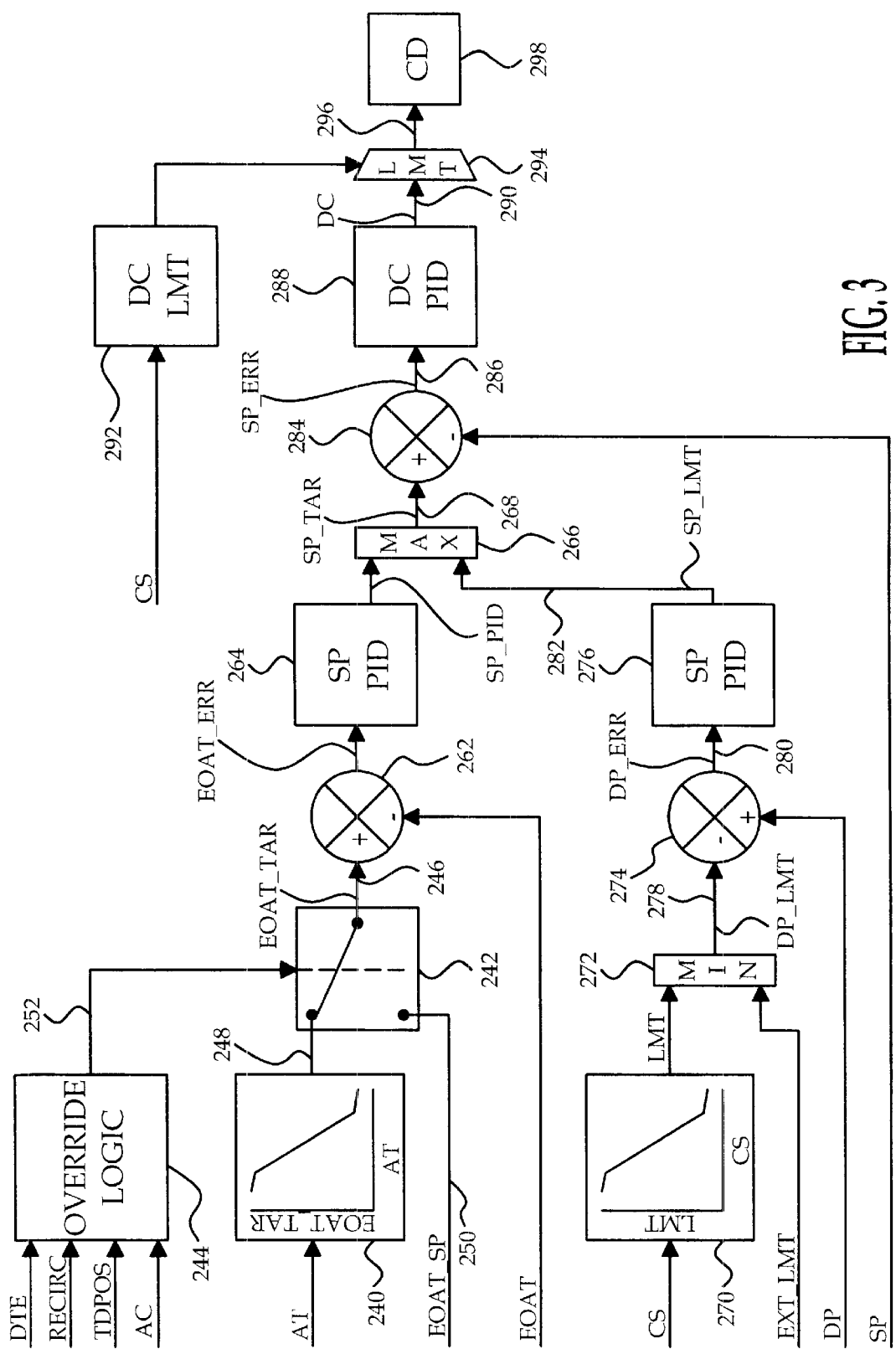
FIG. 3 is a block diagram of a compressor capacity control method carried out by the control unit of FIG. 1 according to a first embodiment of this invention.

FIG. 3 depicts a compressor capacity control method according to a first embodiment of this invention. Referring to FIG. 3, the blocks 240, 242 and 244 develop an evaporator outlet air temperature target EOAT_TAR on line 246. The block 240 is a look-up table that develops energy-efficient evaporator outlet air temperature values as a function of ambient air temperature AT on line 248, whereas a pre-programmed evaporator outlet air temperature set point EOAT_SP for override operation is provided on line 250. The lines 248 and 250 are supplied as inputs to selector switch 242, which supplies one of the inputs to line 246. In energy-efficient operation, the selector switch 242 supplies the output of block 240 to line 246 as indicated in FIG. 3; in an override condition, the selector switch is activated to supply EOAT_SP to line 246. Activation of selector switch 242 is controlled by the override logic block 244, which is responsive to automatic climate control parameters including the air conditioning request status AC, the discharge temperature error DTE (i.e., the difference between the commanded and measured discharge air temperatures), the commanded cabin air recirculation level (RECIRC), and the position TDPOS of the temperature control door 56. If the inputs indicate that the driver is requesting normal AC, or that the driver is requesting energy efficient AC, but the set temperature TSET cannot be achieved after a given time delay, the override logic block 244 activates the selector switch 242 via line 252 to set EOAT_TAR equal to EOAT_SP. An inability to achieve TSET is detected when there is a persistent discharge temperature error (DTE) with full cabin air recirculation and no re-heating of the conditioned air.

The summing junction 262 forms a difference between the selected EOAT_TAR value and the measured EOAT value to form a temperature error EOAT_ERR. The temperature error EOAT_ERR is supplied as an input to PID (proportional-plus-integral-plus-differential) block 264, which forms a suction pressure control signal SP_PID for reducing EOAT_ERR. For example, if EOAT_ERR indicates that EOAT is higher than EOAT_TAR, SP_PID will tend to reduce in value, which requests the system 10 to produce a lower suction pressure for increased cooling of the conditioned air.

Since the suction pressure control signal SP_PID produced by PID block 264 may become too low from a systems perspective when EOAT_ERR is large, the block 266 sets the suction pressure target SP_TAR on line 268 to the greater (MAX) of SP_PID and a limit value SP_LMT determined by the blocks 270–276. The limit value SP_LMT serves to limit the compressor discharge pressure, and is determined based on the compressor speed CS, the measured discharge pressure DP, and optionally an externally supplied discharge pressure limit value EXT_LMT. The compressor speed CS may be determined based on the engine speed ES and the known drive pulley ratio. The block 270 is a table of discharge pressure limit values LMT as a function of compressor speed CS, and the block 272 sets the discharge pressure limit DP_LMT on line 278 equal to the lesser (MIN) of LMT and EXT_LMT. The external limit EXT_LMT may be developed, for example, by a powertrain or engine controller for purposes of limiting the engine load imposed by system 10 during vehicle acceleration. The block 274 forms a difference between DP_LMT and the measured discharge pressure DP to form a discharge pressure error term DP_ERR on line 280. The discharge pressure error DP_ERR is supplied as an input to PID block 276, which forms a corresponding suction pressure control signal SP_LMT on line 282 for reducing DP_ERR whenever DP exceeds DP_LMT. Specifically, if DP exceeds DP_LMT, the output of PID block 276 will tend to increase and dominate suction pressure target SP_TAR on line 268, which will tend to drive the compressor discharge pressure downward.

The summing junction 284 forms a difference between the suction pressure target value SP_TAR and the measured suction pressure SP to form the suction pressure error SP_ERR on line 286. The suction pressure error SP_ERR is supplied as an input to PID block 288, which forms a PWM duty cycle control signal DC on line 290 for reducing SP_ERR. For example, if SP_ERR indicates that SP is higher than SP_TAR, DC will tend to increase in value to increase the compressor pumping capacity. However, the output of PID block 288 is subject to limitation based on the compressor speed CS, as indicated by blocks 292 and 294, with the limited duty cycle command on line 296 being supplied to a coil driver (CD) 298 for the capacity control valve coil 140.

The PID blocks 264, 276 and 288 preferably each incorporate an anti-wind-up mechanism to limit the integral component of their output when the duty cycle output of PID block 288 on line 290 approaches 0% or 100%. Allowing the PID outputs to increase further under such conditions is undesirable, as it would tend to saturate the entire control and degrade the control performance. And of course, the PID functions could be replaced with other known control strategies, such as fuzzy logic or neural-network controls.

Figure 4:
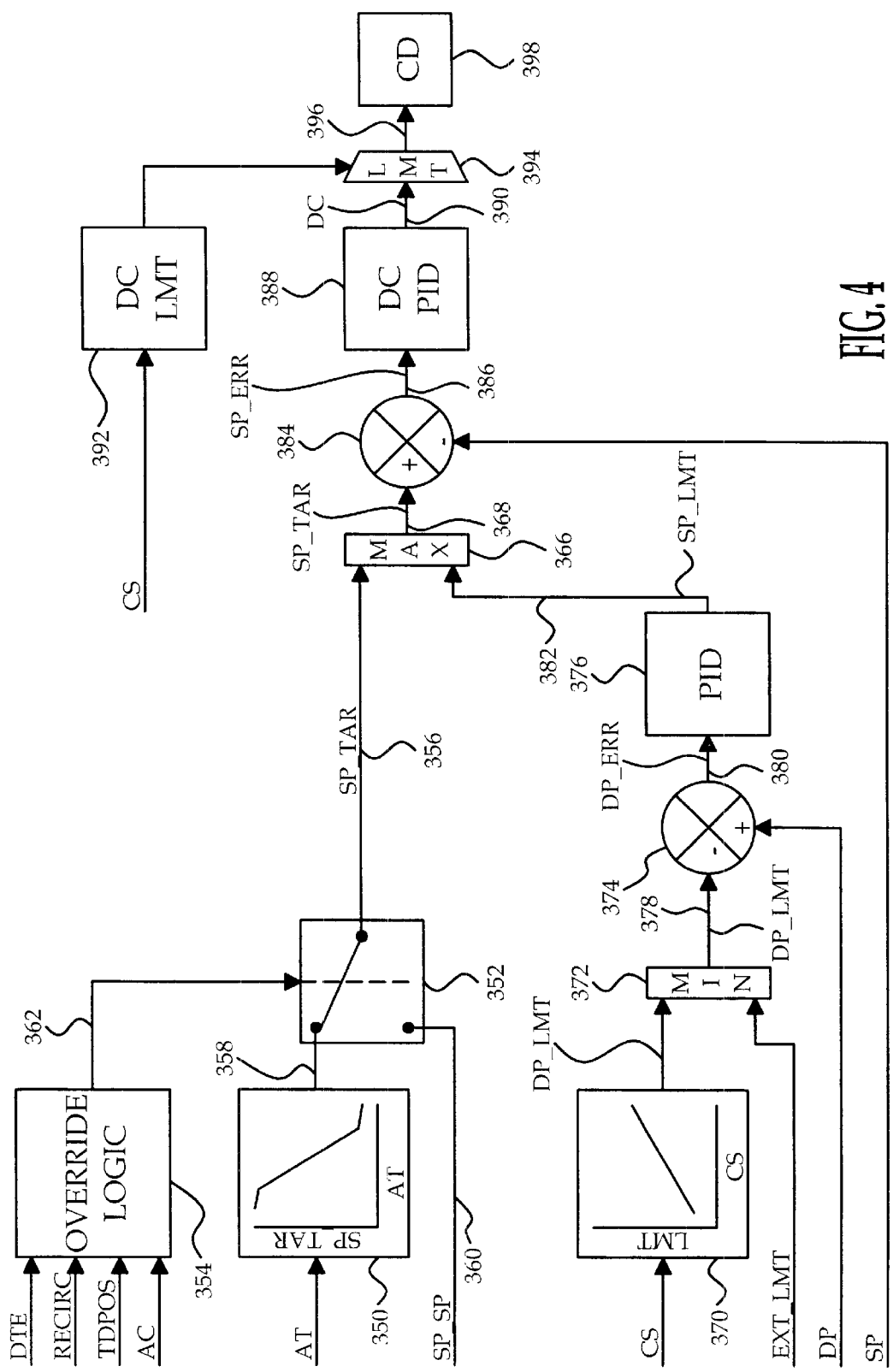
FIG. 4 is a block diagram of a compressor capacity control method carried out by the control unit of FIG. 1 according to a second embodiment of this invention.

FIG. 4 depicts a compressor capacity control method according to a second embodiment of this invention. Referring to FIG. 3, the blocks 350, 352 and 354 develop a suction pressure target SP_TAR on line 356. The block 350 is a look-up table that develops energy-efficient suction pressure values as a function of ambient air temperature AT on line 358, whereas a pre-programmed suction pressure set point SP_SP for override operation is provided on line 360. The lines 358 and 360 are supplied as inputs to selector switch 352, which supplies one of the inputs to line 356. In energy-efficient operation, the selector switch 352 supplies the output of block 350 to line 356 as indicated in FIG. 4; in an override condition, the selector switch 352 is activated to supply SP_SP to line 356. Activation of selector switch 352 is controlled by the override logic block 354, which is responsive to automatic climate control parameters including the air conditioning request status AC, the discharge temperature error DTE (i.e., the difference between the commanded and measured discharge air temperatures), the commanded cabin air recirculation level (RECIRC), and the position TDPOS of the temperature control door 56. If the inputs indicate that the driver is requesting normal AC, or that the driver is requesting energy efficient AC, but the set temperature TSET cannot be achieved after a given time delay, the override logic block 354 activates the selector switch 352 via line 362 to set SP_TAR equal to SP_SP. An inability to achieve TSET is detected when there is a persistent discharge temperature error (DTE) with full cabin air recirculation and no re-heating of the conditioned air.

Since the target suction pressure SP_TAR on line 356 may become too low from a systems perspective when the ambient air temperature AT is high, the block 366 sets the suction pressure target SP_TAR on line 368 to the greater (MAX) of the value on line 354 and a limit value SP_LMT on line 382 determined by the blocks 370–376. The limit value SP_LMT serves to limit the compressor discharge pressure, and is determined based on the compressor speed CS, the measured discharge pressure DP, and optionally an externally supplied discharge pressure limit value EXT_LMT. The block 370 is a table of discharge pressure limit values LMT as a function of compressor speed CS, and the block 372 sets the discharge pressure limit DP_LMT on line 378 equal to the lesser (MIN) of LMT and EXT_LMT. As indicated above, the external limit EXT_LMT may be developed, for example, by a powertrain or engine controller for purposes of limiting the engine load imposed by system 10 during vehicle acceleration. The block 374 forms a difference between DP_LMT and the measured discharge pressure DP to form a discharge pressure error term DP_ERR on line 380. The discharge pressure error DP_ERR is supplied as an input to PID block 376, which forms a corresponding suction pressure control signal SP_LMT on line 382 for reducing DP_ERR whenever DP exceeds DP_LMT. Specifically, if DP exceeds DP_LMT, the output of PID block 376 will tend to increase and dominate suction pressure target SP_TAR on line 368, which will tend to drive the compressor discharge pressure downward.

The summing junction 384 forms a difference between the suction pressure target value SP_TAR and the measured suction pressure SP to form the suction pressure error SP_ERR on line 386. The suction pressure error SP_ERR is supplied as an input to PID block 388, which forms a PWM duty cycle control signal DC on line 390 for reducing SP_ERR. For example, if SP_ERR indicates that SP is higher than SP_TAR, DC will tend to increase in value to increase the compressor pumping capacity. However, the output of PID block 388 is subject to limitation based on the compressor speed CS, as indicated by blocks 392 and 394, with the limited duty cycle command on line 396 being supplied to a coil driver (CD) 398 for the capacity control valve coil 140.

As with the embodiment of FIG. 3, the PID blocks 376 and 388 preferably each incorporate an anti-wind-up mechanism to limit the integral component of their output when the duty cycle output of PID block 388 on line 390 approaches 0% or 100%. Allowing the PID outputs to increase further under such conditions is undesirable, as it would tend to saturate the entire control and degrade the control performance. And of course, the PID functions could be replaced with other known control strategies, such as fuzzy logic or neural-network controls.

In summary, this invention provides an energy-efficient control method for a vehicle air conditioning system including an electrically variable capacity refrigerant compressor. The system can be configured as an automatic climate control as described in the illustrated embodiment, or as a manually controlled system in which the driver manipulates interface panel knobs and/or levers to position the doors 44, 56, 64, 66 and to control the blower speed. Additionally, the capacity control valve 17 may be configured to provide less or more functionality than shown; for example, the pressure transducers may be provided externally, or at least some of the functionality of the control unit 90 may be performed by control circuitry resident within the control valve 17. Also, the refrigerant pressures may be estimated or indirectly determined based on measured temperatures, if desired. Moreover, the control methods of this invention are also applicable to air conditioning systems where the compressor is driven by an electric motor (in which case, the compressor capacity is adjusted by changing the motor speed), and to clutchless systems where the pulley 14 is rigidly coupled to the compressor drive shaft (in which case, the compressor is effectively turned off by reducing its capacity to a minimum value). Many other variations are also possible, and it should be recognized that control methods incorporating such modifications may fall within the intended scope of this invention, which is defined by the appended claims.

What is claimed is:

1. A method of controlling a variable capacity compressor of an air conditioning system, where the compressor receives refrigerant at a suction pressure and produces refrigerant at a discharge pressure, the method comprising the steps of:

determining the discharge pressure;

selecting a target suction pressure based on an ambient air temperature;

limiting the target suction pressure based on the determined discharge pressure when the determined discharge pressure exceeds a discharge pressure limit; and controlling the compressor to adjust its capacity as required to achieve the limited target suction pressure.

2. The method of claim 1, including the steps of:

determining the suction pressure; and adjusting the capacity of said compressor based on a deviation of the determined suction pressure from the limited target suction pressure.

3. The method of claim 1, where the system includes an interface panel for operator activation of normal or energy-efficient air conditioning, and the method includes the step of:

selecting the target suction pressure based on the ambient air temperature when energy-efficient air conditioning is activated, and setting the target suction pressure to a predetermined set point when normal air conditioning is activated.

4. The method of claim 1, including the steps of:

detecting an under-capacity condition of said air conditioning system; and setting the target suction pressure to a predetermined value when said under-capacity condition is detected.

5. The method of claim 4, where the system includes mechanisms for setting a desired air discharge temperature and for controlling re-heating of conditioned air and an amount of air recirculation, and the step of detecting an under-capacity condition of the air conditioning system includes the step of:

detecting said under-capacity condition when the desired air discharge temperature cannot be achieved with no re-heating of the conditioned air and maximum air recirculation.

6. The method of claim 1, wherein the system includes an evaporator, the produced refrigerant is expanded and supplied to said evaporator, and the step of selecting a target suction pressure comprises the steps of:

selecting a target evaporator outlet air temperature based on the ambient air temperature;

determining an outlet air temperature of the evaporator; and selecting the target suction pressure based on a deviation of the target evaporator outlet air temperature from the determined outlet air temperature.

7. The method of claim 6, where the system includes an interface panel for operator activation of normal or energy-efficient air conditioning, and the method includes the step of:

selecting the target evaporator outlet air temperature based on the ambient air temperature when energy-efficient air conditioning is activated, and setting the target evaporator outlet air temperature to a predetermined set point when normal air conditioning is activated.

8. The method of claim 6, including the steps of:

detecting an under-capacity condition of said air conditioning system; and setting the target evaporator outlet air temperature to a predetermined value when said under-capacity condition is detected.

9. The method of claim 8, where the system includes mechanisms for setting a desired air discharge temperature and for controlling re-heating of conditioned air and an amount of air recirculation, and the step of detecting an under-capacity condition of the air conditioning system includes the step of:

detecting said under-capacity condition when the desired air discharge temperature cannot be achieved with no re-heating of the conditioned air and maximum air recirculation.

10. The method of claim 1, wherein the discharge pressure limit is determined according to a speed of said compressor.

11. The method of claim 1, where the step of limiting the target suction pressure includes the steps of:

determining a system-related discharge pressure limit;

receiving an externally developed discharge pressure limit; and setting said discharge pressure limit according to the lesser of said system-related limit and said externally developed limit.

12. The method of claim 1, wherein the step of limiting said target suction pressure includes the steps of:

determining a suction pressure limit based on a deviation of the determined discharge pressure from said discharge pressure limit; and setting said limited target suction pressure to the greater of the target suction pressure and said suction pressure limit.

* * * * *